C. E. O'KEENAN.
CLOCK.
APPLICATION FILED OCT. 20, 1913.

1,218,692.

Patented Mar. 13, 1917.

Witnesses:
J. J. Wallace
René Bruine

Inventor:
Charles Edouard O'Keenan
By Attorneys,
Fraser, Funk & Myers

UNITED STATES PATENT OFFICE.

CHARLES EDOUARD O'KEENAN, OF PARIS, FRANCE.

CLOCK.

1,218,692. Specification of Letters Patent. Patented Mar. 13, 1917.

Application filed October 20, 1913. Serial No. 796,228.

*To all whom it may concern:*

Be it known that I, CHARLES EDOUARD O'KEENAN, a citizen of the Republic of France, and residing at Paris, France, have invented certain new and useful Improvements in Clocks, of which the following is a specification.

The present invention has for its object a synchronous electrical clock which consists in the employment of an electric clockwork generator working uniformly and producing a single or polyphase alternating current which is led to a series of secondary electrical clocks working as synchronous motors.

A synchronous clockwork generator is formed in a manner to convert a continuous electric current into a single or polyphase alternating current. The converter, for example, comprises permanent magnets to produce a magnetic field, a fixed magnetic core, and an armature rotating in the said magnetic field and around the magnetic core, the converter receiving through an ordinary continuous current commutator the current from a battery or other source of continuous current. Opposite the commutator is collected at suitable points of the armature by conductors connected to two or more rings, the single or polyphase current which is transmitted to the secondary clocks. These may assume the general form of the clock work generator provided with two or more rings connected by conductors at suitable points of their armature but do not generally comprise a continuous current commutator-rectifier.

Uniformity of movement in the clockwork generator is assured by connecting its motor shaft, by means of an elastic coupling, such as a coil or spiral spring, to its escapement, no matter what the system may be.

The following description with reference to the accompanying drawings will explain how this synchronous clockwork system may be carried out in practice.

The clockwork generator is constituted by an armature $a$ having a drum or ring as the winding member turning around a magnetic core $A^1$ fixed in any suitable manner and in a magnetic field created by the poles $b$, $c$, of a permanent magnet. On the armature shaft is fixed on one side the continuous current commutator of a type, for example, having three segments $d$ connected in known manner with the armature winding and on which rub the brushes $p$, $q$, branching from the circuit supplied with continuous current from a battery $e$. In the battery circuit is introduced a resistance $f$, which serves as a current damper by lessening by its effect either the weakening of the current in course of time or the variation of its electromotive force in accordance with the temperature, and which serves also to moderate the motive couple of the converter in regulating the intensity in a manner to maintain it between certain practical limits.

The armature shaft is in gear with the clockwork by means of worm $r$, a toothed pinion $s$, spindle $t$ and an elastic coupling $x$, as mentioned above. The motive couple proportional to the armature intensity actuates one end of the spring while the other end of the spring drives the shaft $u$ of an escapement wheel $v$, in a manner analogous to that described in applicant's French patent specification No. 411673 of 1910. The mean tension of the spring $x$ can be varied at will by varying the regulating resistance $f$ or by varying the number of cells in battery $e$ and thus varying the intensity of constant current supplied to the converter; in this way the amplitude of the oscillations of the escapement can be varied in a manner to bring it within the technically indicated limits. As these oscillations remain isochronous as long as they do not exceed certain limits (for example an amplitude of from 0° to 4°, with a pendulum) the intensity can also be varied between corresponding limits without interfering with the isochronism of the oscillations.

Theory and practice show that with this arrangement the armature acquires a mean normal speed which is quite constant; it may be said that the revolutions of the motor armature are isochronized by the escapement. The angular speed is between certain prescribed limits when the escapement oscillations remain isochronous, altogether independent of the intensity of the constant current supplied to the converter. The armature thus isochronized produces a force opposed to the strictly constant electromotive force and is capable of calibrating the electromotive force.

Figure 3:
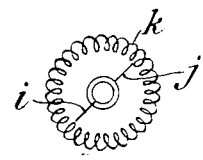
Fig. 3 shows the arrangement with respect to the simple alternating current of the same converter.

Opposite the commutator $d$, in the case of a monophase converter, are fixed on the armature shaft two rings $g$, $h$ which are connected, as is seen in the arrangement in Fig. 3, by the conductors $i$, $j$ at two diametrically opposite points to the armature winding $k$. On the rings rub the brushes $l$, $m$ connected to conductors $n$, $o$ of the feed line.

Between these two rings $g$, $h$ the rotatable converter produces an alternating potential the frequency of which is quite constant.

Figure 1:
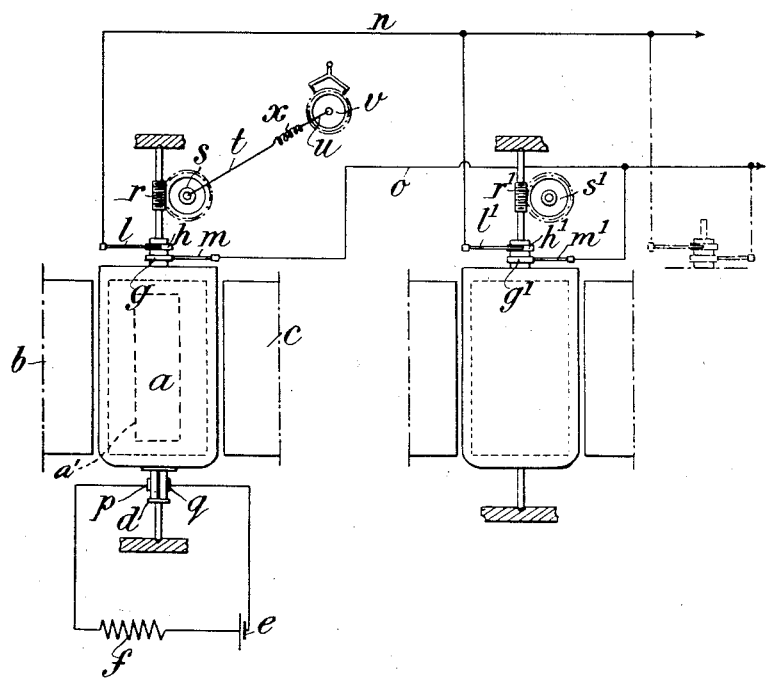
Figure 1 represents, diagrammatically, the clockwork generator also a synchronous secondary clock which branches off the line of the alternating current produced by the generator.
Figure 2:
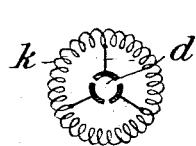
Fig. 2 shows the arrangement with respect to the continuous current of the armature of the generator having a three segment commutator.

The alternating current produced by the generator is led to the secondary clocks which are branched from the line $n$, $o$ and of which one is represented in Fig. 1.

The secondary clock is constituted by an armature similar to the armature of the generator but does not comprise generally a continuous current commutator, its shaft being provided with only two rings $h'$, $g'$ on which the receiver brushes $l'$, $m'$ rub. The armature actuates, by means of a worm $r'$ mounted on its shaft, worm wheel $s'$ and suitable wheels, the hour wheels and the striking mechanism, if any, by an arrangement of wheels such as is described in applicant's French Patent No. 444818 of 10th June 1912, but in which the escapement is omitted.

The alternating monophase current of absolutely constant frequency produced by means of the clockwork generator as has been described and working with a strictly constant mean speed causes a synchronous working of the secondary clocks by virtue of the properties of the alternating current and without any other escapement organ and the system which is the object of this invention allows a series of electric clocks to be established which keep absolute time provided the controlling clock is itself exact.

The system which has been described furnishes a monophase current, if the converter produces for example a triphase current, in order to avoid dead points and permit of easy starting it is necessary to take off the current from the armature from three points situated 120° apart, to employ three collecting rings both for the converter and the receivers or secondary clocks and to employ three leads for connecting them up; in certain cases, however, these three leads may be reduced to two, when a start has been once made, as practice may direct.

Having now described the nature of my said invention and the best means I know of carrying the same into practical effect, I claim:—

1. A primary actuator in an electric time system, serving the purpose of a master-clock comprising an electric converter adapted to furnish current to a secondary clock or clocks, and a clock-escapement regulating the movement of the rotor of said converter.

2. A primary actuator in an electric time system, serving the purpose of a master-clock, comprising an electric converting device adapted to furnish current to a secondary clock or clocks, a clock escapement regulating the movement of the rotor of said converting device and a resilient connection between said rotor and said escapement.

3. A primary actuator in an electric time system, serving the purpose of a master-clock, comprising an electric converting device adapted to furnish current to a secondary clock or clocks, a clock escapement regulating the movement of the rotor of said converting device, and means for varying the torque of said driving means, thereby varying the amplitude of movement of the oscillatory part of the escapement.

4. A primary actuator in an electric time system, serving the purpose of a master-clock, comprising an electric converting device adapted to furnish current to a secondary clock or clocks, a clock escapement regulating the movement of the rotor of said converting device, a resilient connection between said rotor and said escapement, and means for varying the torque of said driving means, thereby varying the tension of said resilient connection and consequently the amplitude of movement of the oscillatory part of the escapement.

5. A primary actuator in an electric time system, serving the purpose of a master-clock, comprising a current converting device adapted to furnish alternating current to a secondary clock or clocks, a clock-escapement regulating the movement of the rotor of said converting device, a resilient connection between said rotor and said escapement, and a regulatable resistance in the circuit of the motor part of said converting device, said regulatable resistance being adapted to vary the current driving said motor part, consequently the torque of the motor part, and consequently the tension of said spring and the amplitude of movement of the oscillatory part of said escapement.

6. A primary actuator in an electric time system, serving the purpose of a master-clock, comprising an electric converting device adapted to furnish alternating current to a secondary clock or clocks, said converting device comprising a generator part and a direct current motor part for driving said generator part, a clock escapement regulating the movement of the rotor of said generator part and a resilient connection between said rotor and said escapement.

In witness whereof, I have hereunto signed my name in the presence of two subscribing witnesses.

CHARLES EDOUARD O'KEENAN.

Witnesses:
 HANSON C. COXE,
 GABRIEL BELLIARD.